United States Patent [19]

Shaffer et al.

[11] 3,951,426
[45] Apr. 20, 1976

[54] BRAKE SYSTEM FOR CART

[75] Inventors: Clifford K. Shaffer, Westfield; Joe B. Weiss, Indianapolis, both of Ind.

[73] Assignee: The United States of America as represented by the Secretary of the Navy, Washington, D.C.

[22] Filed: July 23, 1975

[21] Appl. No.: 598,317

[52] U.S. Cl................ 280/47.34; 188/21; 188/72.3; 188/170
[51] Int. Cl.².............. B60T 13/04; B62B 3/00
[58] Field of Search.............. 280/47.34, 33.99 C; 188/17, 19, 21, 72.3, 170, 119

[56] References Cited
UNITED STATES PATENTS

| | | | |
|---|---|---|---|
| 3,061,049 | 10/1962 | Bramley | 280/47.34 |
| 3,095,211 | 6/1963 | Altherr | 280/33.99 C |
| 3,458,015 | 7/1969 | Collins | 280/33.99 C |
| 3,500,965 | 3/1970 | Nossokoff | 280/33.99 C |
| 3,556,266 | 1/1971 | McCarthy | 188/72.3 |

*Primary Examiner*—Robert R. Song
*Attorney, Agent, or Firm*—R. S. Sciascia; Paul S. Collignon

[57] ABSTRACT

A brake system for a cart having at least two non-pivotal wheels. A pair of wheels are fixedly mounted on a rotatable axle which has a pair of hubs keyed thereto. A brake disc is associated with each hub and is restrained from rotation but is movable relative to the longitudinal axis of the axle. A brake element is provided for each disc and has a movable shoe and a fixed shoe so that, upon actuation of the brake element, the movable shoe engages one side of the disk and moves the disk into contact with the fixed shoe. The brake element is normally in a locked or braking condition and is unlocked by hydraulic means. Both brake elements are operated by a single control unit.

5 Claims, 4 Drawing Figures

U.S. Patent    April 20, 1976    Sheet 1 of 2    3,951,426 ns and
more particularly to a brake system for a cart.

BRAKE SYSTEM FOR CART

BACKGROUND OF THE INVENTION

The invention relates to manually propelled carts and more particularly to a brake system for a cart.

Various types of braking devices are used on manually propelled carts, such as shopping carts and industrial trucks, and these braking devices are provided to prevent rolling of the carts when unattended and also some devices are designed to prevent removal of the carts from the premises.

A typical antirolling device for a shopping cart is shown and described in U.S. Pat. No. 3,500,965, entitled, "Antiroll Device For Shopping Carts And The Like", which issued Mar. 17, 1970, to A. L. Nossokoff et al. The antiroll device consists of a rod having a friction means on the end and a spring is provided for biasing the friction means against a wheel. A crankarm assembly is provided for moving the rod into locked and unlocked positions.

In U.S. Pat. No. 3,366,201, entitled "Wheel Lock", which issued Jan. 30, 1968, to John W. Pesta, there is shown a mechanism for locking a wheel to prevent removal of the cart from the vicinity of a supermarket. A wheel lock is preset so that travel by the cart over a curbing or obstacle of a predetermined height causes the wheel lock to lock a wheel of a shopping cart.

SUMMARY OF THE INVENTION

The present invention provides an antiroll device for a manually operated cart such as a cart having aircraft test equipment thereon and which is designed for shipboard use, such as use on the deck of an aircraft carrier. The cart has at least one pivotal wheel and two non-pivotal wheels so that it can be readily moved and guided to a desired location.

A pair of non-pivotal wheels are fixedly attached to either one shaft, or a pair of shafts, and the shaft or shafts, as the case may be, are rotatably mounted to the frame of the cart. A pair of hubs are also fixedly attached to the shaft, or shafts, and a brake disk is associated with each hub. Each disk is constrained from relative rotation with respect to its associated hub, that is, the disk is rotated by the hub, however, each disk can move outwardly from the hub. A braking element having a movable shoe and a fixed shoe is provided for each disk and is normally in an engaging position. The movable shoe engages the disk and moves the disk into engagement with the fixed shoe so that the disk is held by both shoes. Hydraulic means are provided for moving the movable brake shoe and, upon actuation, resilient means are employed for moving the disk to an unlocked position. Both braking elements are operated by a single control level attached to the handle of the cart.

DESCRIPTION OF THE PREFERRED EMBODIMENT

Figure 1:
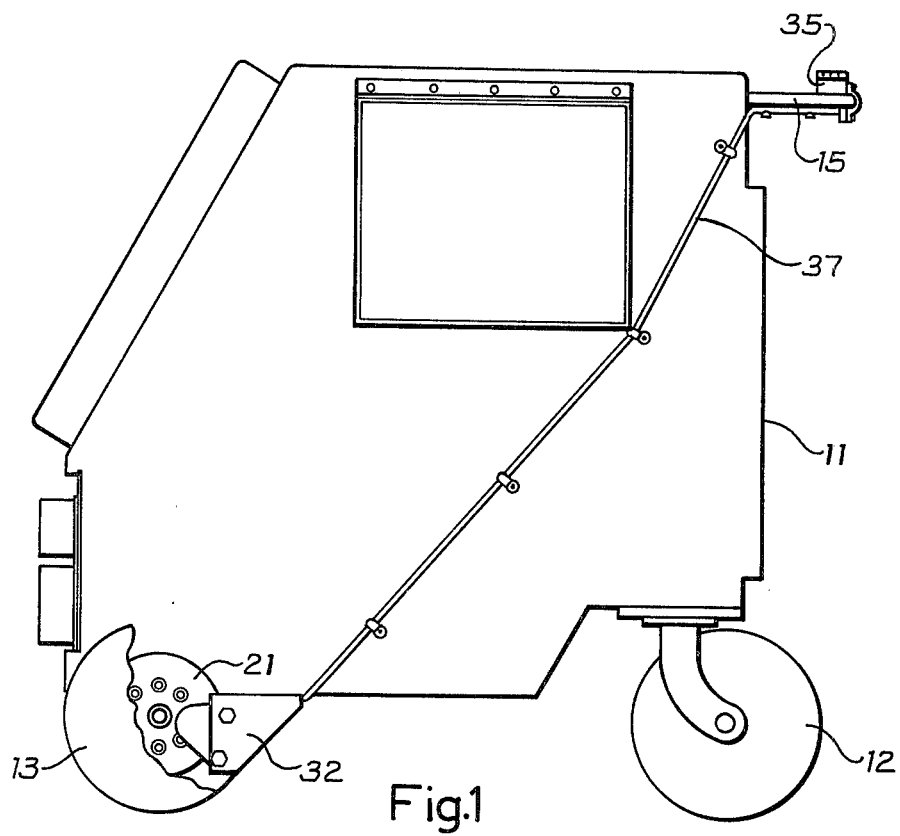
FIG. 1 is a side view of a preferred embodiment of the present invention.

Referring now to the drawings, there is shown a cart 11 having a pivotal wheel 12 and a pair of non-pivotal wheels 13 and 14. A handle 15 is attached to the top of the cart above the pivotal wheel to facilitate pushing and guiding cart 11. Wheel 13 is attached, as by a key, to an axle 16 and wheel 14 is likewise attached to an axle 17. Axles 16 and 17, in turn, are rotatably mounted to the underside of carts 11 in either bearings or bushings designated by the numeral 18. As axles 16 and 17 are preferably in longitudinal alignment, it can readily be seen that a single axle could be used in lieu of the two axles 16 and 17. As wheels 13 and 14 are fixedly attached to an axle, the use of two axles 16 and 17 increases maneuverability of cart 11 as each wheel can turn independently of the other wheel.

Figure 3:
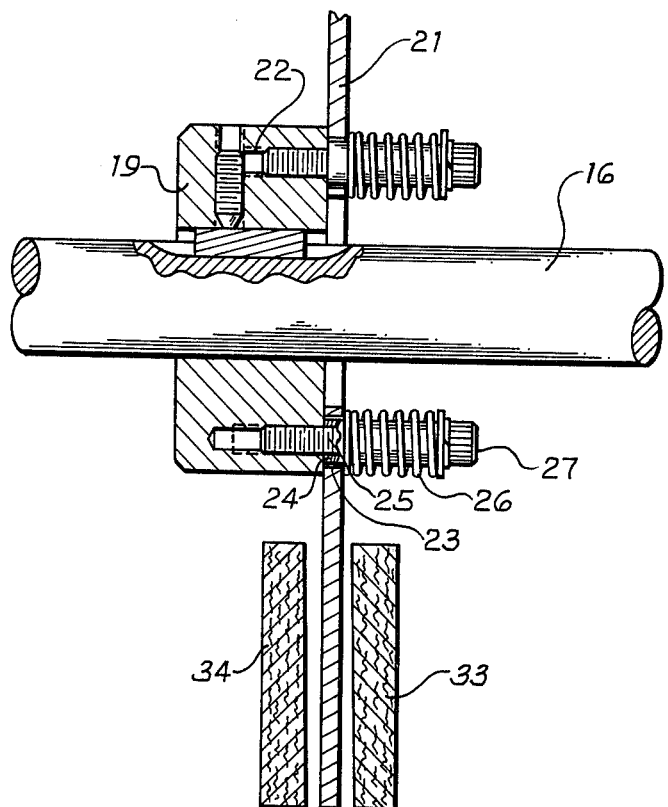
FIG. 3 is a top view showing a brake disk in an unlocked position.
Figure 4:
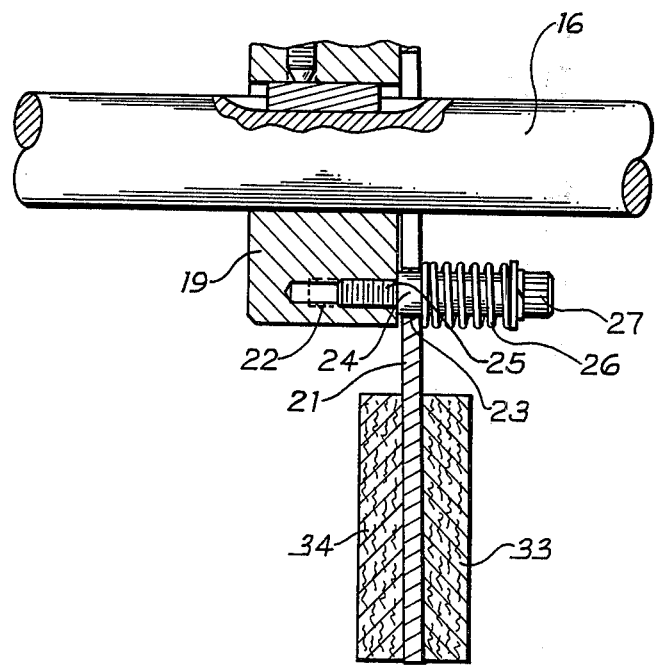
FIG. 4 is a top view showing a brake disk in a locked position.

Axles 16 and 17 each have a hub 19 thereon and a brake disk 21 is attached to each hub 19. As best shown in FIGS. 3 and 4 of the drawings, hubs 19 are keyed to the shaft on which they are mounted and the outer extending face of each hub is provided with a plurality of tapped holes 22. Disk 21 is provided with a plurality of holes 23, and disk 21 is supported to hub 19 by a plurality of standoffs 24 that pass through holes 23. Standoffs 24 are attached to hub 19 by bolts 25 and a spring 26 is provided around each standoff 24 between disk 21 and the head 27 of a bolt 25. It can readily be seen that disk 21 rotates with the hub 19 to which it is attached but, additionally, disk 21 can move outwardly a short distance from the end face of hub 19.

A pair of braking devices 30 and 31 are attached to the underside of cart 11 by means of brackets 32, and each braking device is provided with a pair of braking elements 33 and 34. Braking element 33 is stationary and braking element 34 is movable and is spring-biased toward braking element 33. By way of example, braking devices 30 and 31 might be of the type manufactured and sold by Tol-O-Matic, Inc., Minneapolis, Minn., 55415, as Model No. FS20A.

Figure 2:
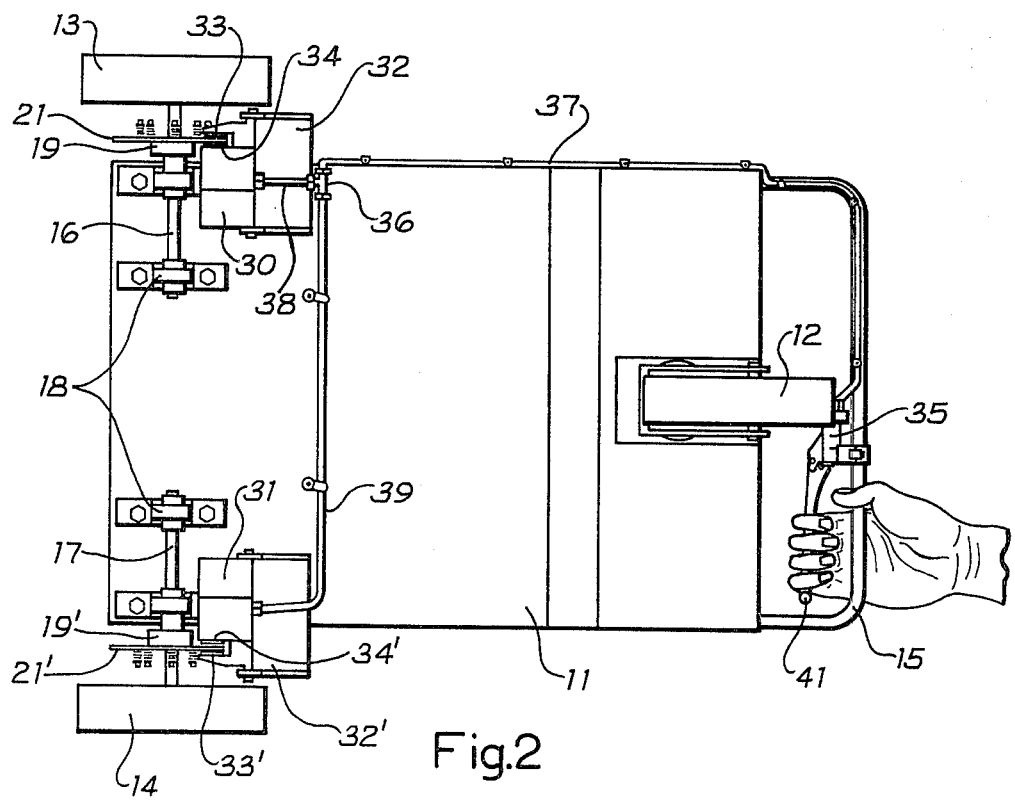
FIG. 2 is a bottom view of the embodiment shown in FIG. 1.

A brake cylinder 35 is attached to handle 15 and contains a quantity of brake fluid. Cylinder 35 is connected to both braking devices 31 by means of tubing and a T-connection 36. As best shown in FIG. 2 of the drawings, tubing 37 connects the input of T-connection 36 with brake cylinder 35 and tubing 38 connects one output of T-connection 36 with braking device 30. Tubing 39 connects the second output of T-connection 36 with braking device 31. Brake cylinder 35 is provided with a lever 41 and, upon actuation of lever 41, brake fluid from cylinder 35 flows to braking devices 30 and 31. By way of example, brake cylinder 35 with lever 41 can be obtained from Hurst/Airheart Products, Inc., Chatsworth, Calif., 91311, as Model No. 03-11616.

OPERATION

Assuming that cart 11 is to be operated aboard a ship, such as an aircraft carrier, it is desirable that both wheels 13 and 14 be locked when cart 11 is in a desired position. With only one wheel being locked, the rolling and pitching of the ship will cause the cart to pivot about the locked wheel causing a potentially dangerous situation. When cart 11 is unattended, no brake fluid is transferred from brake cylinder 35 and braking devices 30 and 31, which are normally locked, engage both disks 21. As best shown in FIG. 4 of the drawings, spring means within braking devices 30 and 31 cause the movable elements 34 to engage disks 21 which, in turn engage stationary elements 33. As disks 21 are prevented from rotating, hubs 19 are also prevented from rotating and, as hubs 19 are keyed to their respective shafts, these shafts and the wheels keyed thereto are prevented from rotating.

Assuming now that it is desired to move cart 11, lever 41, which is attached to the cart handle 15, is actuated and brake fluid is applied to braking devices 30 and 31 by way of tubing 37, T-connection 36 and tubings 38 and 39. Actuation of braking devices 30 and 31 causes movable elements 34 to retract and disengage disks 21. Springs 26 then move disks 21 against the end fact of hubs 19 to which they are attached and disks 21 are disengaged from stationary element 33. Disks 21 are now free to rotate as shown in FIG. 3 of the drawings, and, in turn, axles 16 and 17 and the wheels attached thereto are free to rotate. As long as lever 41 remains actuated, wheels 13 and 14 are free to rotate, however, when lever 41 is released, movable elements 34 again engage disks 21 and bias disks 21 against stationary elements 33 thereby locking disks 21 and axles 16 and 17.

It can thus be seen that the braking system of the present invention operates as a "dead-man's brake" in that a positive force is required to release the braking system and upon removal of this positive force, the braking system is automatically operated. Thus when cart 11 is unattended, wheels 13 and 14 are locked.

Obviously many modifications and variations of the present invention are possible in the light of the above teachings. It is therefore to be understood that within the scope of the appended claims the invention may be practiced otherwise than as specifically described.

We claim:

1. A braking system for a cart having at least two non-pivotal wheels and at least one pivotal wheel and an operator push handle comprising, axle means rotatably attached to said cart, first and second wheels fixedly attached to said axle means and rotatable therewith, first and second hubs fixedly attached to said axle means and rotatable therewith, first and second brake disks resiliently connected, respectively, to said first and second hubs, said brake disks being fixed against rotation relative to said hubs and movable longitudinally with respect to said axle means, first and second pairs of brake shoes, one shoe of said first pair being movable and positioned on one side of said first brake disk and the other shoe of said first pair being stationary and positioned on the opposite side of said first brake disk, and one shoe of said second pair being movable and positioned on one side of said second brake disk and the other shoe of said second pair being stationary and positioned on the opposite side of said second brake disk, first spring means for normally biasing said movable brake shoe of said first pair of brake shoes into engagement with said first disk and said first disk into engagement with said stationary brake shoe of said first pair of brake shoes and second spring means for normally biasing said movable brake shoe of said second pair of brake shoes into engagement with said second disk and said second disk into engagement with said stationary brake shoe of said second pair of brake shoes, first and second retracting means for disengaging said first and second movable brake shoes, respectively, from said first and second brake disks, and a single hydraulic means for operating both said first and second retracting means.

2. A braking system for a cart having at least two non-pivotal wheels, at least one pivotal wheel and an operator push handle as set forth in claim 1 wherein said axle means comprises first and second longitudinally aligned axles each having one wheel and one hub attached thereto.

3. A braking system for a cart having at least two non-pivotal wheels, at least one pivotal wheel and an operator push handle as set forth in claim 2 wherein said wheels and hubs are keyed to the axle to which they are attached.

4. A braking system for a cart having at least two non-pivotal wheels, at least one pivotal wheel and an operator push handle as set forth in claim 2 wherein said single hydraulic means for operating both said first and second retracting means comprises a single master cylinder connected by tubing to both said retracting means and a quantity of brake fluid in said master cylinder and tubing.

5. A braking system for a cart having at least two non-pivotal wheels, at least one pivotal wheel and an operator push handle as set forth in claim 4 wherein said master cylinder is attached to said operator push handle and has a lever for transferring additional brake fluid from said master cylinder to said first and second retracting means.

* * * * *